US008505695B2

(12) United States Patent
Kubick et al.

(10) Patent No.: US 8,505,695 B2
(45) Date of Patent: Aug. 13, 2013

(54) METHOD AND APPARATUS FOR FACILITATING PERFORMANCE OF VEHICLE BRAKING SYSTEMS

(75) Inventors: Damian Paul Kubick, Stockton, MO (US); Terrence Christopher Donelson, Springfield, MO (US); Michael James Donelson, Springfield, MO (US)

(73) Assignee: Donelson Brake Systems, LLC, Clever, MO (US)

( * ) Notice: Subject to any disclaimer, the term of this patent is extended or adjusted under 35 U.S.C. 154(b) by 1140 days.

(21) Appl. No.: 12/080,188

(22) Filed: Apr. 1, 2008

(65) Prior Publication Data

US 2009/0242337 A1    Oct. 1, 2009

(51) Int. Cl.
*F16D 55/02* (2006.01)

(52) U.S. Cl.
USPC ............ 188/71.8; 188/196 A; 188/78; 188/79

(58) Field of Classification Search
USPC .................. 188/71.8, 196 A, 79.56, 364, 78, 188/79, 349, 265; 303/9.62, 186, 187, 188; 137/512.5
See application file for complete search history.

(56) References Cited

U.S. PATENT DOCUMENTS

| | | | |
|---|---|---|---|
| 2,345,811 A * | 4/1944 | Harp | 188/351 |
| 2,544,849 A * | 3/1951 | Martin | 60/590 |
| 3,039,269 A * | 6/1962 | Hill | 60/535 |
| 3,120,244 A * | 2/1964 | Hahn | 137/512.5 |
| 3,161,024 A * | 12/1964 | Ryskamp | 60/580 |
| 3,346,078 A * | 10/1967 | Dobb | 188/346 |
| 3,699,679 A * | 10/1972 | Bardos et al. | 60/579 |
| 3,734,246 A * | 5/1973 | Montjourides | 188/196 A |
| 3,871,716 A | 3/1975 | Skoyles | |
| 4,305,623 A | 12/1981 | Seabase | |
| 4,565,067 A | 1/1986 | Tani et al. | |
| 4,755,008 A | 7/1988 | Imoto et al. | |
| 4,792,023 A * | 12/1988 | Morimoto et al. | 188/353 |
| 5,188,439 A * | 2/1993 | Burgdorf et al. | 303/116.1 |
| 7,383,928 B2 * | 6/2008 | Leboisne | 188/265 |
| 2006/0070826 A1 * | 4/2006 | Thibeault | 188/71.1 |

* cited by examiner

*Primary Examiner* — Robert A Siconolfi
*Assistant Examiner* — Mariano Sy
(74) *Attorney, Agent, or Firm* — Armstrong Teasdale LLP

(57) ABSTRACT

A method of assembling a vehicle braking system retrofit package includes assembling a braking mechanism having a first bias. The method also includes assembling at least one automatic hydraulic brake adjuster (AHBA) having a second bias and a third bias. The method further includes coupling the at least one AHBA in flow communication with the braking mechanism such that the second bias and the third bias cooperate with the first bias to facilitate modulating the braking mechanism to predetermined positions.

20 Claims, 8 Drawing Sheets

METHOD AND APPARATUS FOR FACILITATING PERFORMANCE OF VEHICLE BRAKING SYSTEMS

BACKGROUND OF THE INVENTION

This invention relates generally to vehicle braking systems and more particularly, to methods and apparatus for facilitating performance of such systems.

Some known vehicles include drum-type braking systems, including wedge-type braking systems. Such drum-type braking systems are frequently employed on large, off-road vehicles that include haul trucks and loaders. In general, drum-type braking systems require frequent calibration adjustments to maintain the associated vehicle stopping action above a predetermined threshold level. Moreover, the forces exerted on the braking systems associated with the larger, heavy-duty vehicles tend to shift the calibration of the brake systems more frequently than on smaller vehicles. Such frequent brake system maintenance decreases vehicle availability and increases total cost of ownership.

BRIEF DESCRIPTION OF THE INVENTION

In one aspect, a method of assembling a vehicle braking system retrofit package is provided. The method includes assembling a braking mechanism having a first bias. The method also includes assembling at least one automatic hydraulic brake adjuster (AHBA) having a second bias and a third bias. The method further includes coupling the at least one AHBA in flow communication with the braking mechanism such that the second bias and the third bias cooperate with the first bias to facilitate modulating the braking mechanism to predetermined positions.

In another aspect, an automatic hydraulic brake adjuster (AHBA) is provided. The AHBA is coupled in flow communication with a braking mechanism having a first bias. The AHBA includes a valve including a valve seat, wherein the valve seat induces a second bias. The AHBA also includes at least one valve spring coupled to the valve. The at least one valve spring induces a third bias. The second bias and the third bias cooperate with the first bias to facilitate modulating the braking mechanism to predetermined positions.

In a further aspect, a vehicle braking system is provided. The system includes at least one substantially arcual brake shoe having a radially outer surface. The system also includes a substantially arcual brake drum having a radially inner surface circumferentially extending about at least a portion of the at least one brake shoe radially outer surface. The system further includes at least one brake actuating device coupled to the at least one brake shoe. The system also includes at least one spring coupled to the at least one brake actuating device and the at least one brake shoe. The at least one brake spring has a first bias. The system further includes at least one automatic hydraulic brake adjuster (AHBA). The at least one AHBA includes a valve including a valve seat, wherein the valve seat induces a second bias. The at least one AHBA also includes at least one valve spring coupled to the valve, wherein the at least one valve spring induces a third bias. The second bias and the third bias cooperate with the first bias to facilitate modulating a radial position of the at least one brake shoe radially outer surface with respect to the least one brake drum radially inner surface.

DETAILED DESCRIPTION OF THE INVENTION

Figure 1:
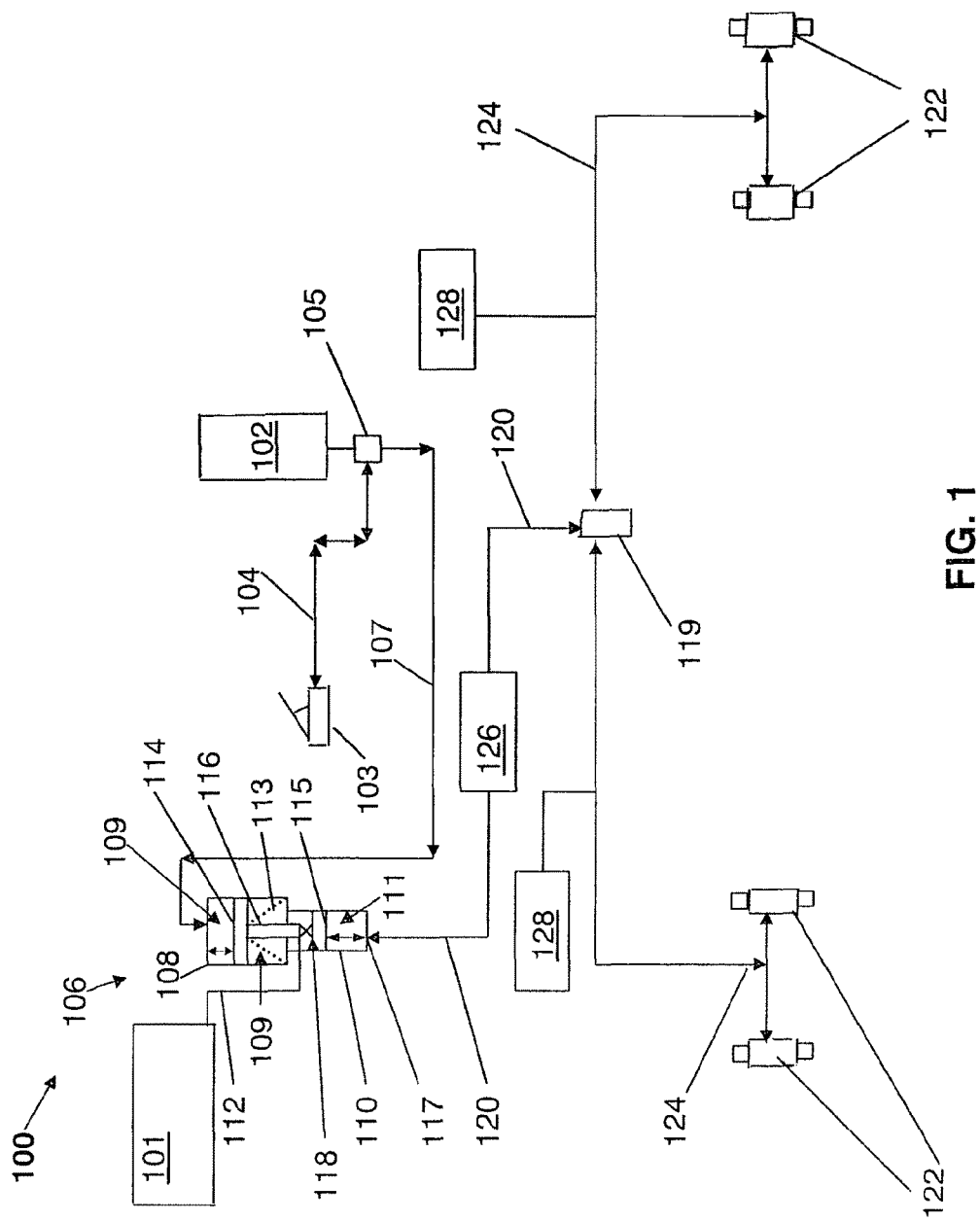
FIG. 1 is a schematic view of an exemplary vehicle braking system.

FIG. 1 is a schematic view of an exemplary vehicle braking system 100. System 100 includes a hydraulic fluid supply reservoir 101 that is configured to store a predetermined volume of hydraulic braking fluid that is primarily used as a fluid supply and makeup source. System 100 also includes an air supply 102. In the exemplary embodiment, air supply 102 is a compressed air tank that is configured to contain a predetermined volume of air at a predetermined pressure. Alternatively, air supply 102 is any source of pressurized air that facilitates operation of system 100 as described herein, including, but not limited to, air compressors. System 100 also includes a service brake 103 that is coupled in flow communication with air supply 102 via a first air conduit 104 and a brake relay 105. In the exemplary embodiment, service brake 103 is a standard floor brake, or treadle valve, that is configured for foot-operation and is typically found in most vehicles. Alternatively, service brake 103 is any operable device that facilitates operation of system 100 as described herein. Service brake 103 is configured to modulate a position of brake relay 105. For example, increased depression of brake 103 increases air pressure within conduit 104 that facilitates opening brake relay 105. Conversely, decreased depression of brake 103 decreases air pressure within conduit 104 that facilitates closing brake relay 105.

System 100 further includes a pressure converter 106 coupled in flow communication to service brake 103 via a second air conduit 107 and brake relay 105. Service brake 103 is configured to cooperate with brake relay 105 to modulate flow of pressurized air from air supply 102 to pressure converter 106 as described above. Pressure converter 106 is configured to convert a pressure of air received via service brake 103 and brake relay 105 to a pressure of hydraulic fluid.

Pressure converter 106 includes an air cylinder 108 that acts as an enclosure for a plurality of components (at least some of which are discussed below). Moreover, air cylinder 108 at least partially defines an air cavity 109 that is coupled in flow communication with second air conduit 107. Also, air cylinder 108 defines a breather port (not shown) within a spring-side of cavity 109 that facilitates air exhaust from cylinder 108. Pressure converter 106 also includes a hydraulic cylinder 110 that acts as an enclosure for a plurality of components (at least some of which are discussed below). Moreover, hydraulic cylinder 110 at least partially defines a hydraulic cavity 111 that is coupled in flow communication with reservoir 101 via a first hydraulic fluid conduit 112.

Pressure converter 106 further includes a spring 113 that is positioned within cavity 109. Pressure converter 106 also includes a first piston 114 coupled to a second piston 115 via a rod 116. Piston 114 is positioned within cavity 109, piston 115 is positioned within cavity 111, and rod 116 extends from cavity 109 to cavity 111. Seals (not shown) mitigate flow communication between cavities 109 and 111 via rod 116. In the exemplary embodiment, first piston 114 has a diameter (not shown) that is approximately 17.1 centimeters (cm) (6.75 inches (in.)). Rod 116 and second piston 115 have diameters (neither shown) of 2.54 cm (1 in.) and 3.18 cm (1.25 in.), respectively. Alternatively, any dimensions for pistons 114 and 115 and rod 116 are used. Piston 114 is configured to contact and compress spring 113 that is biased to induce an upward force on piston 114. Hydraulic cylinder 110 at least partially defines a first port 117 that is coupled in flow communication with hydraulic cavity 111. Moreover, rod 116 forms an indentation that facilitates hydraulic fluid flow between conduit 112 and a portion of cavity 111 above piston 115. Also, piston 115 defines a small fluid passage (not shown) that is drilled within piston 115 to facilitate flow communication between the portion of cavity 111 above piston 115 and a portion of cavity 111 below piston 115.

In operation, converter 106 modulates hydraulic fluid pressure downstream of first port 117. Such fluid pressure is a function of air pressure received from service brake 103 and by associated vertical travel of piston 114 within air cavity 109 and piston 115 within hydraulic cavity 111, both as illustrated by bi-directional arrows.

Specifically, in operation, depression of service brake 103 increases air pressure within conduit 104 that facilitates opening brake relay 105. Pressurized air stored in air supply 102 increases air pressure within conduit 107 and the portion of air cavity 109 above piston 114. In the exemplary embodiment, a range of air pressures within cavity 109 on top of piston 114 is approximately 0.0 kiloPascal (kPa) (0.0 pounds per square inch (psi)) with brake 103 fully released to 861.8 kPa (125 psi) with brake 103 fully depressed. Alternatively, any air pressure range as a function of brake 103 position is used.

The increase in air pressure within cavity 109 on top of piston 114, as facilitated by depression of brake 103, induces a downward force on piston 114 in opposition to an upward force exerted on piston 114 by spring 113. As piston 114 travels downward within cylinder 108, the upward force exerted on piston 114 by spring 113 increases as a function of a spring constant and a distance spring 113 is compressed. Also, as piston 114 travels downward, air is exhausted via the breather port on the spring side of cavity 109 such that the downward force on piston 114 is facilitated by a larger differential pressure across piston 114. Also, as piston 114 travels downward, rod 116 and piston 115 also travel downward within cylinder 110 wherein indentation 118 shifts downward away from conduit 112, thereby at least partially isolating conduit 112 from the portion of cavity 111 above piston 115. Moreover, as piston 115 travels downward, hydraulic fluid downstream of piston 115 is further pressurized to, in the exemplary embodiment, pressures within a range of 0 kPa (0 psi) to 27,580 kPa (4000 psi). Typically, with brake 103 fully released and air pressure at 0.0 kPa (0.0 psi), hydraulic pressure within cavity 109 is approximately 0.0 kPa (0.0 psi). Moreover, with brake 103 fully depressed and air pressure at 861.8 kPa (125 psi), hydraulic pressure within cavity 109 is approximately 27,580 kPa (4000 psi). Alternatively, any range of hydraulic fluid pressure is used.

Downward travel of pistons 114 and 115 and rod 116 is substantially halted when the downward forces exerted on piston 114 are substantially equaled by the upward force exerted by spring 113.

Conversely, decreased depression of brake 103 decreases air pressure within conduit 104 that facilitates closing brake relay 105. Therefore, in operation, as depression of brake 103 is relaxed, air pressure within cavity 109 is decreased and pistons 114 and 115 travel upward as facilitated by exertion of spring 113. As piston 115 travels upward, hydraulic fluid pressure in the hydraulic fluid circuit downstream of port 117 is decreased. As rod 116 travels upward, indentation 118 facilitates hydraulic fluid flow to/from conduit 112 and reservoir 101 from/to the portion of cavity 111 above piston 115. Therefore, both actions of opening a flow path between conduit 112 and cavity 111 and decreasing fluid pressure in cavity 111 facilitate hydraulic fluid flow through the passage formed within piston 115. Such flow through the passage thereby facilitates both replenishment of hydraulic fluid within the circuit downstream of port 117 and depressurization of at least a portion of system 100 downstream of port 117.

System 100 further includes an automatic hydraulic brake adjuster (AHBA) 119 that is coupled in flow communication with converter 106 via a second hydraulic fluid conduit 120. System 100 also includes a plurality of brake actuators 122 coupled in flow communication with AHBA 119. Actuators 122 are configured to induce a first bias within system 100. AHBA 119 is configured to induce a second and third bias within system 100. AHBA 119, actuators 122 and the associated bias are discussed further below.

System 100 also includes hydraulic fluid pressure locking device 126 that is coupled in flow communication with cylinder 110 and AHBA 119 within conduit 120. In the exemplary embodiment, device 126 is a solenoid-operated valve that is electrically coupled to a manually-operated on/off switch (not shown) in a truck cab (not shown). Alternatively, device 126 is any device that facilitates operation of system 100 as described herein, including, but not limited to, a spring-loaded and orificed check valve. Device 126 is configured to perform as a wheel-locking device, or line lock, that facilitates locking a set of brakes on a particular axle (neither shown in FIG. 1) for circumstances requiring momentary parking as compared to extended, or permanent, parking. Specifically, device 126 is configured to facilitate a substantially static hydraulic fluid pressure within a portion of vehicle braking system 100 between actuators 122 and device 126. More specifically, device 126 includes a valve seat and valve disc (neither shown) that facilitate extended actuation of system 100 associated with a rear axle (not shown in FIG. 1) in lieu of maintaining depression of brake 103. Such action by device 126 facilitates operation associated with a vehicle (not shown in FIG. 1) that includes, but is not limited to, backing up, stopping to receive a load, and dumping a load.

System 100 further includes at least one pressure sensing device 128 coupled in flow communication with each of conduits 124. In the exemplary embodiment, device 128 is a standard fluid pressure transmitter that is configured to sense fluid pressure in the associated conduit 124 and generate and transmit an electronic signal proportional to such pressure. Alternatively, any pressure sensing device that facilitates operation of system 100 as described herein is used. Also, in the exemplary embodiment, sensor 128 is configured with a pressure sensing range of approximately 0 kPa (0 psi) to approximately 27,580 kPa (4000 psi). Alternatively, sensor 128 is configured to sense pressure in any range. Moreover, in the exemplary embodiment, the electronic signal is transmitted to output devices (not shown in FIG. 1) (discussed further below) that facilitate delivery of operational indications associated with system 100 to a vehicle operator. Alternatively, the electronic signal is transmitted to a controller (not shown) for facilitating control of devices that include, but are not limited to, AHBA 119.

In the exemplary embodiment, system 100 is configured to be installed as a retrofit package on vehicles currently in service. Alternatively, system 100 may be installed on new vehicles. An exemplary method of assembling a vehicle braking system retrofit package includes assembling a braking mechanism, or actuators 122 having a first bias. The method also includes assembling at least one automatic hydraulic brake adjuster (AHBA) 119 having a second bias and a third bias. The method further includes coupling at least one AHBA 119 in flow communication with braking actuators 122 such that the second bias and the third bias cooperate with the first bias to facilitate modulating braking actuators 122 to predetermined positions.

In operation, typically, when service brake 103 is not depressed, the air pressure within conduit 107 is approximately 0.0 kPa (0.0 psi). When service brake 103 is depressed by an operator to initiate a braking action, an increase in air pressure within conduit 107 is facilitated. Pressure converter 106 senses the increase in air pressure within conduit 107 and converts the increased air pressure to an increased hydraulic fluid pressure at port 117 as described above. The increased pressure within the substantially incompressible fluid is transmitted to AHBA 119 via device 126 and hydraulic fluid conduit 120. AHBA 119 further transmits the increase in fluid pressure to valve actuators 122 via conduits 124 and a braking action is initiated.

Also, in operation, when the braking action is no longer desired, the operator relaxes the depression of brake 103 resulting in a decrease in air pressure within conduit 107. The decrease in air pressure in conduit 107 is sensed by pressure converter 106 which transmits a decreased fluid pressure to AHBA 119 via port 117, conduit 120, and device 126. AHBA 119 facilitates a reduction in fluid pressure being transmitted to actuators 122 via conduits 124. As the fluid pressure being transmitted to actuators 122 decreases, the braking action is relaxed. If desired, device 126 may be engaged to maintain a substantially static hydraulic fluid pressure for a predetermined period of time. Moreover, in the exemplary embodiment, electronic signals generated by devices 128 are transmitted to output devices that facilitate delivery of system 100 parameters to a vehicle operator. Alternatively, the electronic signals are transmitted to a controller for facilitating control of devices that include, but are not limited to, AHBA 119.

Figure 2:
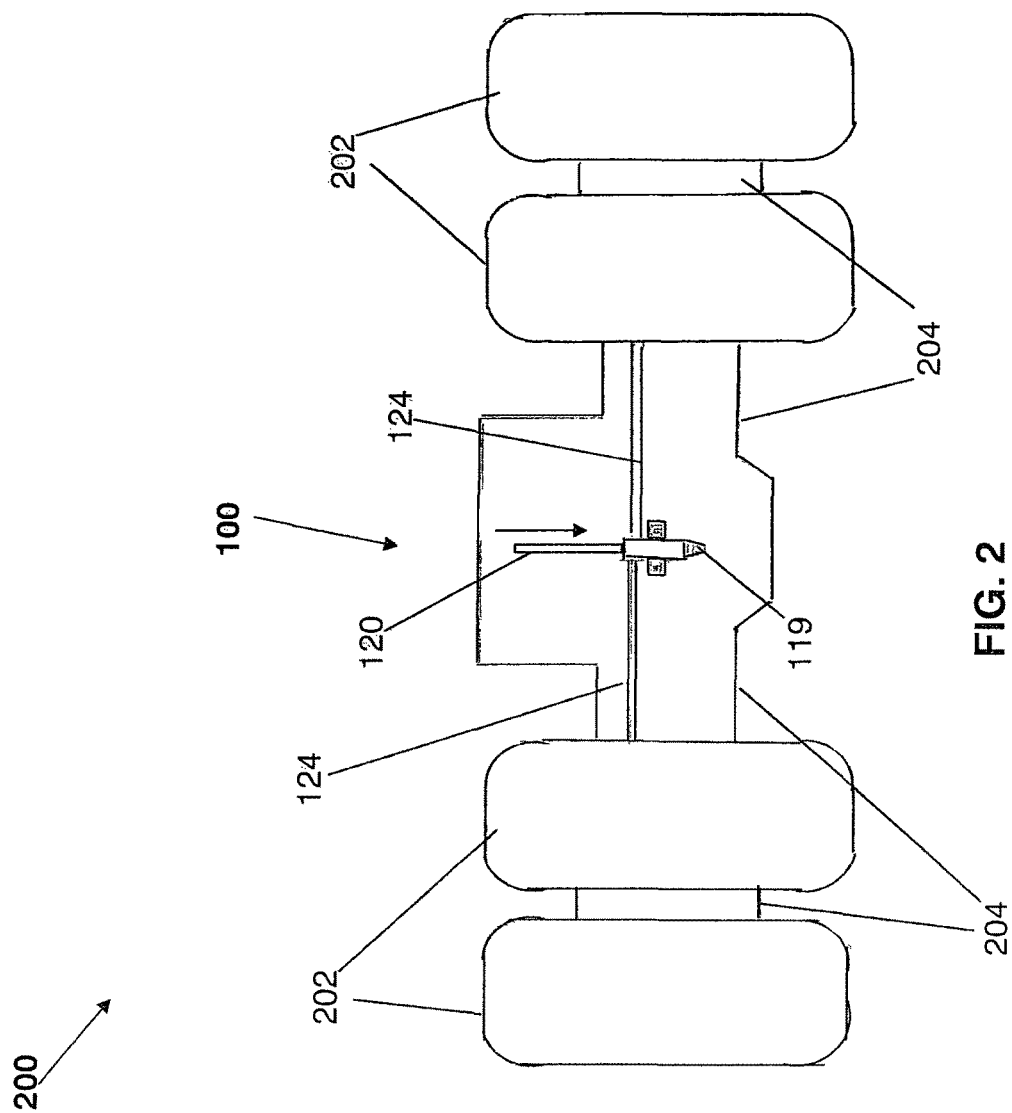
FIG. 2 is a schematic view of a portion of an exemplary vehicle with the vehicle braking system shown in FIG. 1.

FIG. 2 is a schematic view of a portion of an exemplary vehicle 200 with vehicle braking system 100. Vehicle 200 includes a plurality of wheels and tires 202 mounted on an axle 204. Exemplary positioning of AHBA 119, second hydraulic fluid conduit 120 and third hydraulic fluid conduits 124 of system 100 within vehicle 200 are illustrated for perspective. Alternatively, components of system 100 are positioned within vehicle 200 in any manner that facilitates operation of system 100 and vehicle 200 as described herein. Vehicle 200 is any heavy vehicle that is configured with wedge or S-Cam brakes including, but not limited to, on-road trucks, off-road trucks, and construction vehicles.

In operation, as increased fluid pressure within conduit 120 is transmitted to conduits 124 via AHBA 119, braking action is applied to wheels 202 via axle 204 and both axle 204 and wheels 202 rotationally decelerate. Moreover, as fluid pressure within conduit 120 is transmitted to conduits 124 via AHBA 119, braking action is applied to wheels 202 via axle 204 and both axle 204 and wheels 202 rotationally decelerate. The deceleration value is a function of the hydraulic fluid pressure transmitted from conduit 120 to conduits 124 via AHBA 119, such pressure being a function of the amount of depression of brake 103 (shown in FIG. 1) as discussed above.

Figure 3:
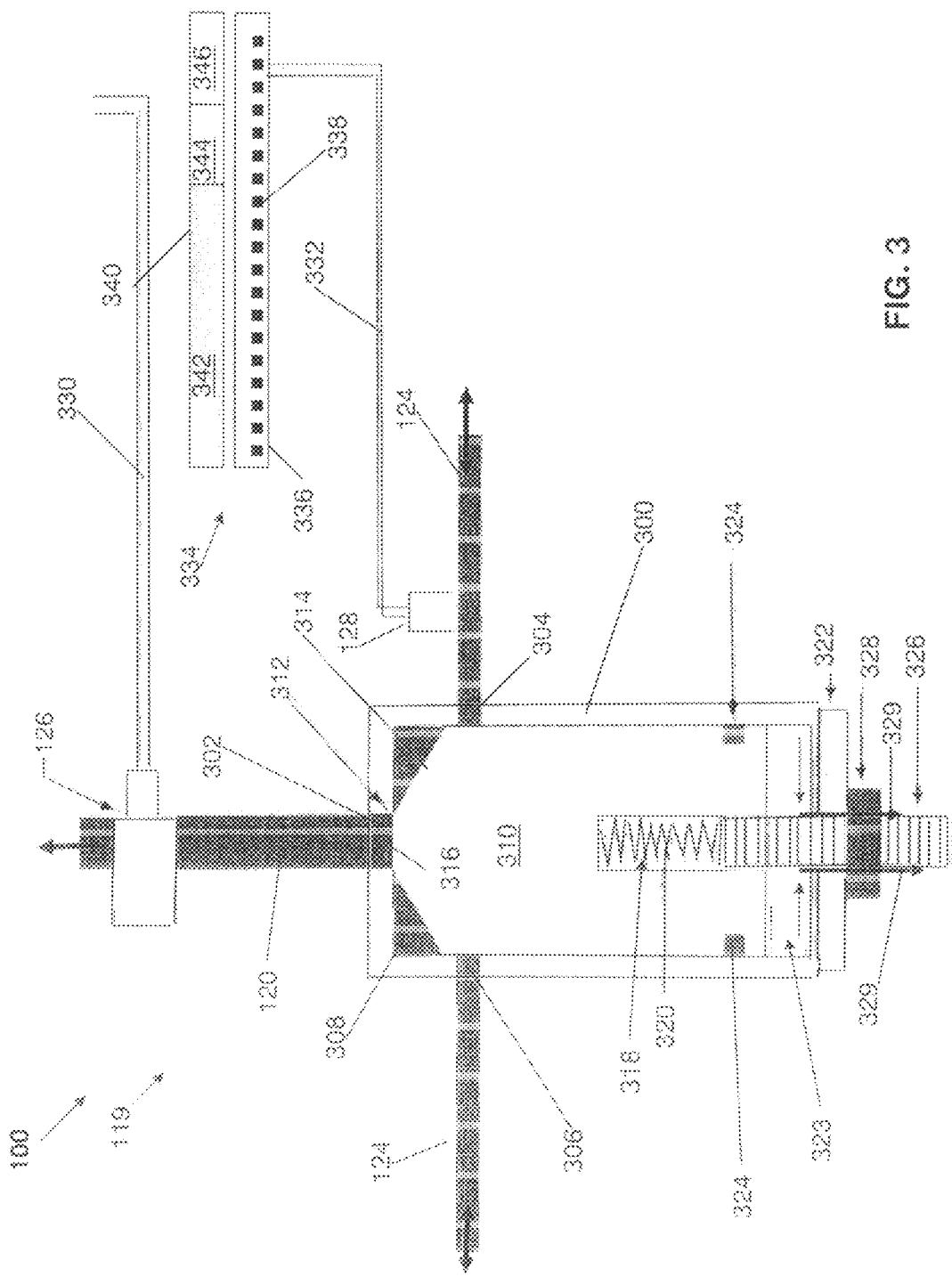
FIG. 3 is a schematic view of an exemplary automatic hydraulic brake adjuster (AHBA) that may be used with the vehicle braking system shown in FIG. 1.

FIG. 3 is a schematic view of exemplary automatic hydraulic brake adjuster (AHBA) 119 that may be used with vehicle braking system 100. AHBA 119 includes a valve body 300 that at least partially defines a plurality of ports in relation to system 100. Specifically, while pressure converter 106 includes a first port 117, AHBA 119 includes a second port 302, a third port 304 and a fourth port 306. Valve body 300 also at least partially defines a cavity 308 and ports 302, 304, and 306 couple cavity 308 in flow communication with device 126 and brake actuators 122 (shown in FIG. 1), respectively.

AHBA 119 also includes a valve 310 positioned within cavity 308. Valve 310 includes a valve seat 312 that includes a beveled surface 314 and seating surface 316. Beveled surface 314 is configured to facilitate inducing the second bias within system 100 while brake actuators 122 are configured to induce the first bias into system 100 as discussed further below. Seating surface 316 is configured to mitigate fluid flow through port 302 when valve 310 is in the closed position. Valve 310 is configured to facilitate coupling fluid conduit 120 in flow communication with fluid conduits 124 via cavity 308 as a function of positioning of valve 310. In the exemplary embodiment, valve 310 cooperates with valve body 300 to form a substantially annular 0.127 millimeter (mm) (0.005 in.) clearance. Alternatively, any clearance that facilitates operation of system 100 as described herein is used.

Valve 310 defines a cavity 318 within valve 310. AHBA 119 further includes a spring 320 that is positioned within cavity 318 and is placed in contact with valve 310. Spring 320 is configured to induce the third bias within system 100.

AHBA 119 also includes a cylinder end cap 322 that is coupled to valve body 300. End cap 322 cooperates with valve body 300 to define cavity 318 and facilitates access to cavity 318 for insertion and removal of valve 310. Moreover, end cap 322, valve 310 and valve body 300 cooperate to define a neutral chamber 323 that is configured to collect small volumes of hydraulic fluid that may seep downward between valve body 300 and valve 310 into chamber 323. AHBA 119 further includes a seal 324 that facilitates mitigating seepage of fluid from a portion of cavity 318 between seal 324 and port 302 into chamber 323. Mitigating such seepage facilitates maintaining a predetermined differential pressure across valve 310, thereby facilitating positioning of valve 310 to predetermined positions as a function of desired operation of brake actuators 122 (shown in FIG. 1). End cap 322 also facilitates access to cavity 318 for inspection and replacement of seal 324.

In the exemplary embodiment, AHBA 119 also includes a brake adjustment screw 326 that extends through end cap 322 into cavity 318 such that it is coupled to spring 320. Screw 326 is configured to adjust a tension within spring 320, and therefore, facilitates adjusting the third bias within system 100. Screw 326 is held in place by a locknut 328. Alternatively, an adjustment device (not shown) that is part of a dynamic, automatic adjustment scheme (not shown) is used. In such an alternative embodiment, a controller (not shown) is coupled in electronic data communication with pressure sensors 128 and the adjustment device. Such adjustment device is operated based at least partially in response to pressure conditions within conduits 124.

In the exemplary embodiment, screw 326, locknut 328 and end cap 322 are configured to cooperate in forming at least one channel (not shown) that facilitates fluid removal from chamber 323. In the exemplary embodiment, the channel is approximately 1 millimeter (mm) (0.040 in.) to 1.27 mm (0.050 in.) in diameter. Alternatively, any dimensions that facilitate operation of system 100 as described herein are used. Such fluid removal (as illustrated by arrows 329) facilitates maintaining a predetermined differential pressure across valve 310, thereby facilitating positioning of valve 310 to predetermined positions as a function of desired operation of brake actuators 122.

FIG. 3 also illustrates a plurality of electrical wires 330 and 332 that transmit electrical power and electrical and electronic signals between an electrical power source and a controller (neither shown) and devices 126 and 128, respectively. Moreover, system 100 further includes at least one hydraulic fluid pressure indicating instrument 334 that is positioned within the operator cab and is coupled in electrical communication with device 128. In the exemplary embodiment, each of third hydraulic fluid conduits 124 have an associated pressure instrument 334. Alternatively, any configuration of pressure sensors 128 and instruments 334 is used that facilitates operation of system 100 as described herein. Instrument 334 includes a light emitting diode (LED) array 336 that includes a plurality of LEDs 338. Instrument 334 also includes a pressure chart 340 that includes a red (low) pressure range 342, an intermediate (amber) pressure range 344 and a high (green) pressure range 346. Instrument 334 is configured such that as hydraulic fluid pressure within an associated conduit 124 increases, a greater number of LEDs 338 are energized. Moreover, instrument 334 is configured to indicate to an operator that fluid pressure is low when only LEDs 338 under range 342 are energized. Similarly, instrument 334 is configured to indicate to an operator that fluid pressure is within an intermediate range and a high range when LEDs 338 under the associated ranges are energized. Typically, a pressure indication in green range 346 indicates greater than 26,890 kPa (3900 psi) which is considered sufficient for operation of system 100. Alternatively, any pressure indication instrument is used that facilitates operation of system 100 as described herein, including, but not limited to digital numerical indicators and analog mechanical pressure gauges.

In operation, valve 310 is positioned as a function of a plurality of forces and biases applied via system 100. Typically, with brake 103 (shown in FIG. 1) fully released, hydraulic fluid pressure within conduit 120 is approximately 0.0 kPa (0.0 psi) and increases to approximately 27,580 kPa (4000 psi) when brake 103 is fully depressed. Such an increase in fluid pressure in fluid conduit 120 is transmitted to valve seating surface 316 of valve seat 312 via port 302 and induces a downward, or opening, force which tends to induce a downward, or opening, movement of valve 310. As valve 310 opens, hydraulic fluid is channeled from conduit 120 into cavity 308. The fluid entering cavity 308 induces the second bias of system 100 by exerting a pressure upon beveled surface 314 of valve seat 312. The second bias is at least partially directly proportional to a predetermined surface area of beveled surface 314 that receives the pressure of the hydraulic fluid contacting surface 314.

Also, in operation, opening of valve 310 as described above facilitates compression of spring 320 against both a portion of valve 310 and a portion of screw 326, both within cavity 318. Compression of spring 320 induces the third bias in system 100, wherein the third bias is at least partially directly proportional to a spring constant of spring 320 and a distance of compression. In the exemplary embodiment, the third bias of system 100 may be adjusted by operation of adjusting screw 326. Specifically, insertion of screw 326 into cavity 318 increases spring compression which subsequently increases the third bias proportionately. Similarly, retraction of screw 326 from cavity 318 decreases spring compression which subsequently decreases the third bias proportionately. Locknut 328 is loosened and subsequently retightened to allow operation of screw 326. Alternatively, an adjustment device that is part of a dynamic, automatic adjustment scheme receives control signals from the controller (not shown) and the adjustment device is operated based at least partially in response to pressure conditions within conduits 124.

Further, in operation, opening movement of valve 310 uncovers ports 304 and 306, thereby coupling ports 304 and 306 in flow communication with cavity 308 such that fluid is channeled into conduits 124 from conduit 120 via cavity 308. Until ports 304 and 306 are uncovered, a substantially static hydraulic fluid pressure value of approximately 276 kPa to 552 kPa (40 psi to 80 psi) is present. Therefore, in a manner similar to conduit 124 and cavity 308, increased fluid pressure is exerted within conduits 124 up to 27,580 kPa (4000 psi) with brake 103 (shown in FIG. 1) fully depressed and braking action of actuators 122 (shown in FIG. 1) is increased. The rate and range of opening of valve 310 is at least partially dependent upon the value of the first, second and third biases of system 100 as well as hydraulic fluid pressure within conduit 120 and cavity 308.

Similarly, in operation, a decrease in fluid pressure in fluid conduit 120 as induced by relaxation of brake 103 is transmitted to valve seating surface 316 of valve seat 312 via port 302. The second bias, that is at least partially directly proportional to a predetermined surface area of beveled surface 314 and the pressure of the hydraulic fluid contacting surface 314, decreases due to the decrease in fluid pressure. The third bias, as a function of at least partially compressed spring 320, induces an upward, or closing, force which tends to induce an upward, or closing, movement of valve 310. Moreover, the fluid pressure exerted within conduits 124 is initially decreased such that the braking action of actuators 122 is decreased.

Also, in operation, as valve 310 closes, ports 304 and 306 are closed off by valve 310, wherein the braking action, or deceleration, of wheels 202 and axel 204 (both shown in FIG. 2) is decreased to substantially zero as the fluid pressure within conduits 124 attains a substantially static value of approximately 276 kPa to 552 kPa (40 psi to 80 psi). Such static pressures within conduits 124 are at least partially a function of the rate of closure of valve 310, which is partially a function of spring 320 compression. Subsequently, depending upon the value of the fluid pressure in conduit 120, valve seating surface 316 closes off port 302. Operation of device 126, as described above, may be used to control the rate of decrease in pressure of the fluid in conduit 120, thereby at least partially controlling the rate of closing of valve 310. Therefore, the rate and range of closing of valve 310 is at least partially dependent upon the value of the first, second and third biases of system 100 as well as the employment of device 126.

Moreover, in operation, seal 324 mitigates fluid seepage into chamber 323 and fluid that collects in chamber 323 is channeled through passages formed by screw 326, locknut 328 and end cap 322. Such fluid removal facilitates maintaining a predetermined differential pressure across valve 310, thereby facilitating positioning of valve 310 to predetermined positions as a function of desired operation of brake actuators 122. Furthermore, pressure indicating instruments 334 indicate hydraulic fluid pressure within each hydraulic fluid conduit 124, thereby providing information to an operator with respect to the fluid pressure being transmitted to each of actuators 122.

Figure 4:
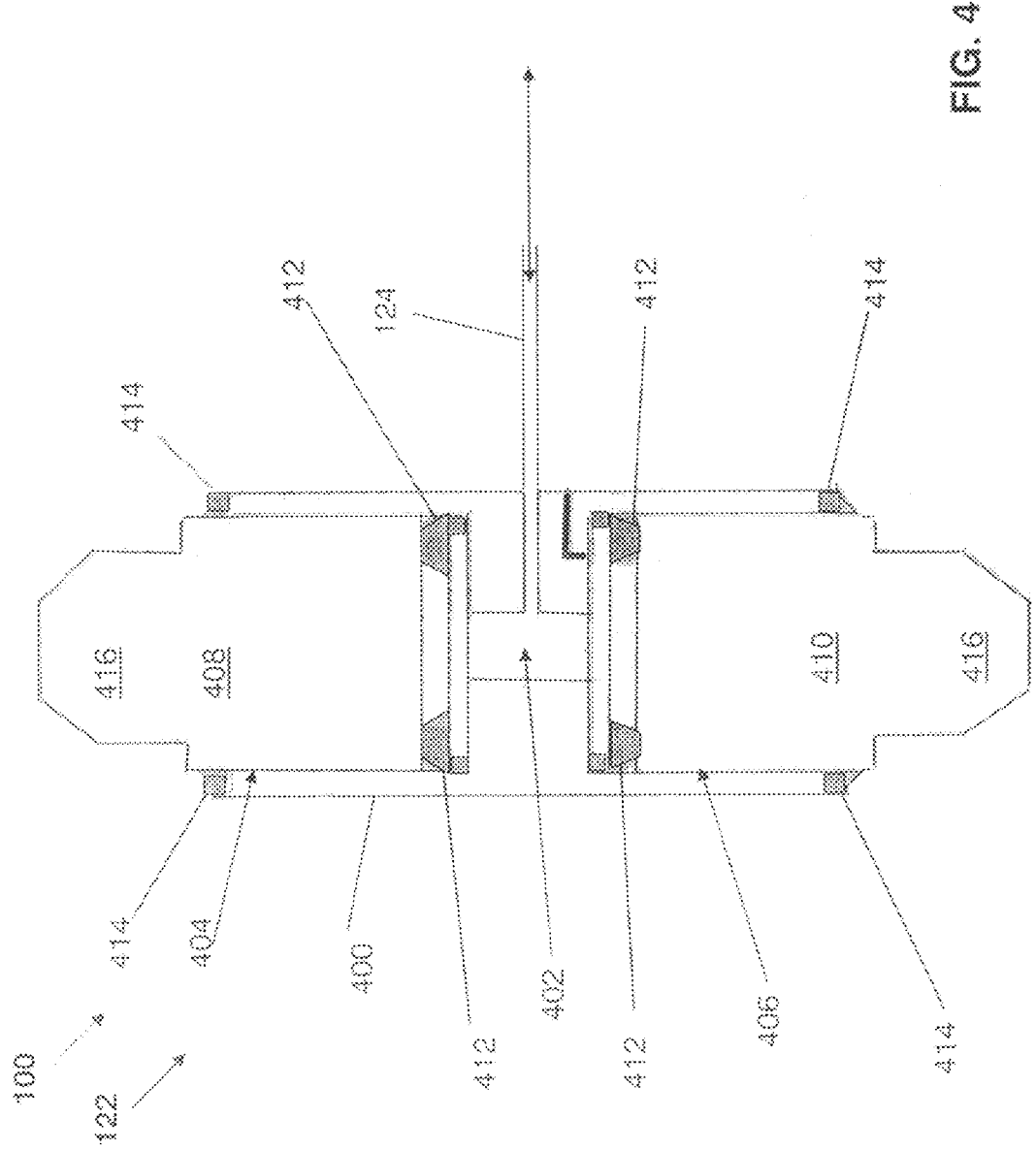
FIG. 4 is a schematic view of an exemplary brake actuator that may be used with the vehicle braking system shown in FIG. 1.

FIG. 4 is a schematic view of exemplary brake actuator 122 that may be used with vehicle braking system 100. One of the plurality of third fluid conduits 124 is illustrated for reference. Actuator 122 includes an actuator body 400 that at least partially defines a fluid cavity 402 that is coupled in flow communication with hydraulic fluid conduit 124. Body 400 also at least partially defines a first piston cavity 404 and a second piston cavity 406. Actuator 122 also includes a first piston 408 and a second piston 410 that are received within cavities 404 and 406, respectively. Pistons 408 and 410 are configured to move inward and outward with respect to cavity 402 at least partially as a function of fluid pressure within cavity 402. Actuator 122 further includes a plurality of cup seals 412 and wiper seals 414, wherein seals 412 and 414 are configured to mitigate fluid leakage from cavities 404 and 406 to atmosphere as pistons 408 and 410 travel within cavities 404 and 406, respectively. Pistons 408 and 410 include piston extensions 416 that facilitate coupling pistons 408 and 410 to brake shoes and brake springs (neither shown in FIG. 4).

In operation, as fluid pressure in conduit 124 increases as a function of depression of brake 103 (shown in FIG. 1) as discussed above, the increased pressure is transmitted to the fluid in cavity 402. The increased pressure in cavity 402 induces a force against pistons 408 and 410, thereby inducing an outward movement of pistons 408 and 410, including extensions 416, against the first bias of system 100, that is, the associated brake springs (as discussed further below). The outward movement of pistons 408 and 410 increases the braking action of vehicle 200 (shown in FIG. 2) as described above. Similarly, as fluid pressure in conduit 124 decreases as a function of relaxation of brake 103 as discussed above, the reduced pressure is transmitted to the fluid in cavity 402. The decreased pressure in cavity 402 reduces the induced force against pistons 408 and 410, thereby inducing an inward movement of pistons 408 and 410, and extensions 416, as a function of the first bias of system 100 associated with the brake springs. The inward movement of pistons 408 and 410 decreases the braking action of vehicle 200.

Figure 5:
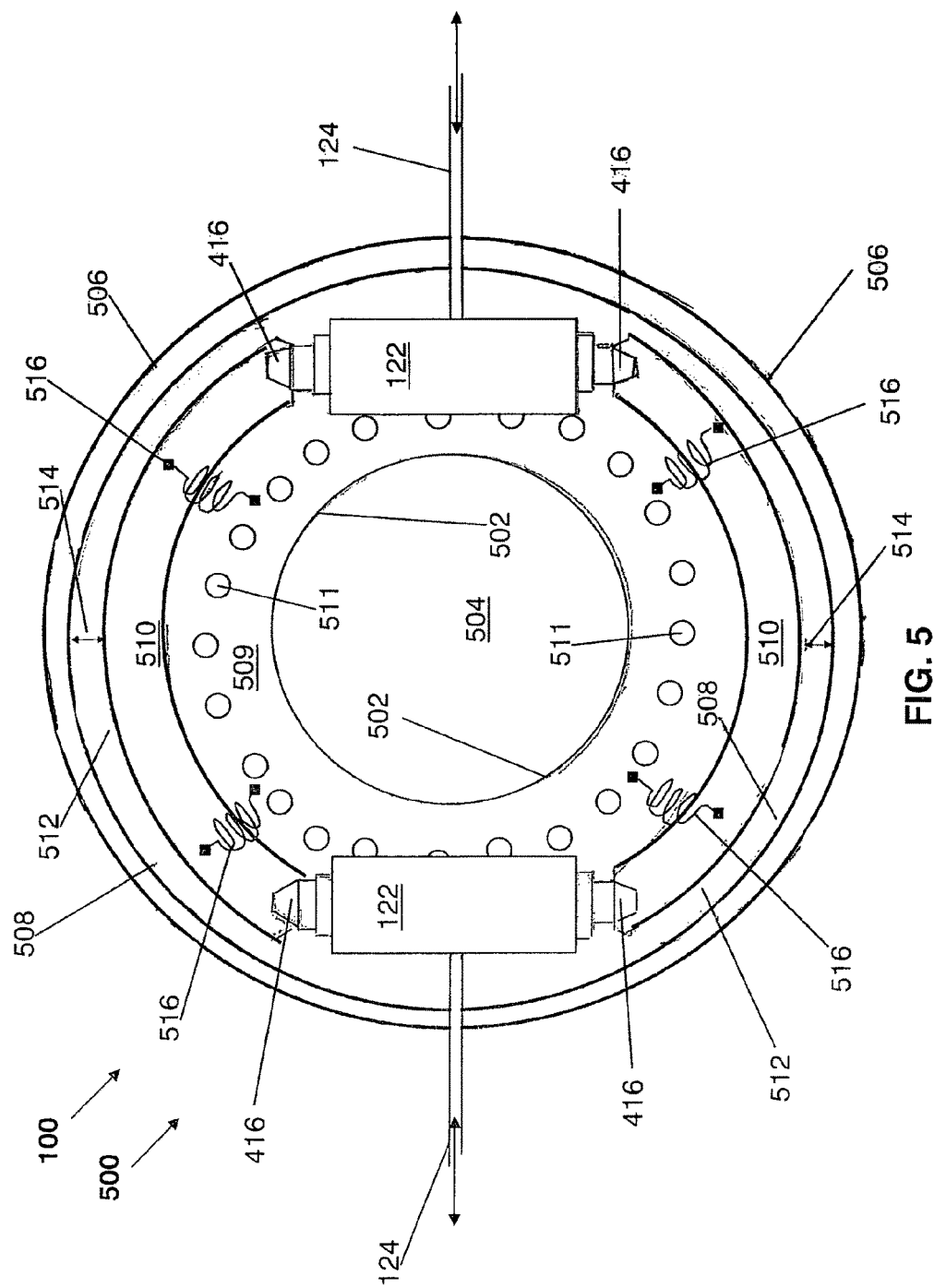
FIG. 5 is a schematic view of an exemplary braking mechanism that may be used with the vehicle braking system shown in FIG. 1.

FIG. 5 is a schematic view of an exemplary braking mechanism 500 that may be used with vehicle braking system 100. Mechanism 500 is a wedge-type braking mechanism and includes an axle housing wall 502 that at least partially defines an axle cavity 504 wherein cavity 504 is sized to receive at least a portion of axle 204 (shown in FIG. 2). Mechanism 500 also includes a brake drum 506 that is substantially arcual and includes a radially inner surface 508. Brake drum 506 is rotatably coupled to a portion of axle 204 of vehicle 200 and is configured to rotate with axle 204 and wheels and tires 202 (shown in FIG. 2).

Mechanism 500 further includes a spider portion, or brake ring 509 that defines a plurality of holes 511. Mechanism 500 also includes a plurality of substantially arcual brake shoes 510 that are coupled to spider portion 509. Each of brake shoes 510 include a radially inner surface, or lining 512. Linings 512 and surface 508 are configured such that contact of linings 512 with surface 508 induces a stopping force on vehicle 200 (shown in FIG. 2). Typically, during periods wherein braking action is not employed, linings 512 and surface 508 are maintained at a predetermined distance 514 from each other. Specifically, in the exemplary embodiment, during such periods of operation, distance 514 is maintained within range 0.0 mm to 0.254 mm (0.000 in. to 0.010 in.). Linings 512 are configured to facilitate substantially continuous light rubbing with surface 508 within such range of distance 514 while mitigating heat generation and excessive wear. Alternatively, any range for distance 514 is used that facilitates operation of system 100 as described herein.

Mechanism 500 also includes plurality of brake actuators 122 coupled to brake shoes 510 via pistons 408 and 410 (shown in FIG. 4), or more specifically, piston extensions 416. As discussed above, fluid conduits 124 are coupled in flow communication with brake actuators 122 and AHBA 119 (shown in FIGS. 1 and 3).

Mechanism 500 further includes a plurality of brake springs 516, wherein each of springs 516 is coupled to brake ring 509 and one of brake shoes 510. Springs 516 are configured to induce the first bias within system 100. Specifically, springs 516 are configured to induce a force opposite in direction to a force produced by fluid in cavity 402 (shown in FIG. 4) within actuators 122. Shoes 510, conduits 124, actuators 122 and springs 516 are configured to remain substantially rotationally stationary within mechanism 500.

In operation, as an operator depresses brake 103 (shown in FIG. 1) hydraulic fluid in conduits 124 flows into brake actuators 122 and fluid pressure within actuators 122 increases as a function of the degree of depression of brake 103 as discussed above. Moreover, piston extensions 416 move outward against the first bias of system 100 induced by springs 516, and brake shoes 510 extend radially outward and distance 514 decreases to zero, if not already attained. Once distance 514 decreases to zero, rotationally stationary linings 512 contact surface 508 of rotating drum 506, and the braking action of vehicle 200 (shown in FIG. 2) is generated and a rotational speed of drum 506 decreases. The braking action is proportional to the force exerted between linings 512 and 508 that is proportional to an amount of depression of brake 103 and the subsequent hydraulic fluid pressure increase. Therefore, the braking action is proportional to an amount of depression of brake 103.

Similarly, as an operator relaxes depression on brake 103, fluid pressure in conduits 124 decreases and the first bias of system 100 induced by springs 516 induces an inward movement of piston extensions 416. The force exerted between linings 512 and 508 begins to decrease as distance 514 approaches approximately 0.0 mm to 0.254 mm (0.000 in. to 0.010 in.) and the braking action of vehicle 200 (shown in FIG. 2) is substantially removed. As discussed above, extended periods of light rubbing between linings 512 and surface 508 at a distance 514 of approximately zero are tolerable. In the event that brake shoes 510 retract radially inward such that distance 514 increases away from zero, rotationally stationary linings 512 break contact with surface 508 of rotating drum 506, and the braking action of vehicle 200 is completely removed. Moreover, as the first bias of system 100 associated with springs 516 induces an inward movement of piston extensions 416, hydraulic fluid is channeled through conduits 124 to converter 106 via AHBA 119 (both shown in FIG. 1). As hydraulic fluid pressure within cavity 308 of AHBA 119 and within conduit 120 (both shown in FIGS. 1 and 3) decreases and valve 310 closes off ports 306 and 304 as described above, a substantially static hydraulic fluid pressure value of approximately 276 kPa to 552 kPa (40 psi to 80 psi) is maintained within conduits 124. Such residual pressure facilitates maintaining distance 514 within the range 0.0 mm to 0.254 mm (0.000 in. to 0.010 in.).

Figure 6:
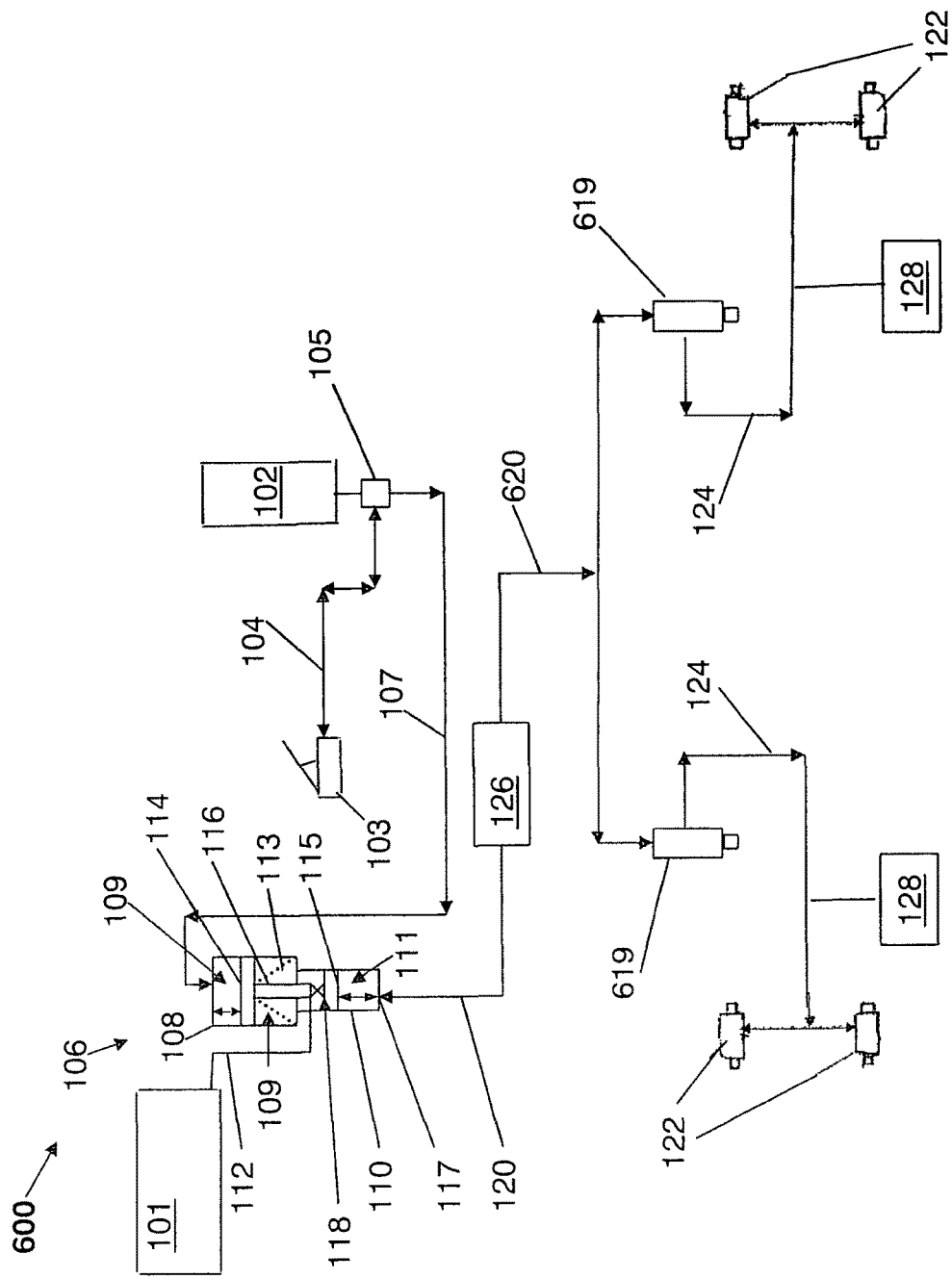
FIG. 6 is a schematic view of an alternative vehicle braking system.

FIG. 6 is a schematic view of an alternative vehicle braking system 600. System 600 is substantially similar to system 100 with the exception that system 600 includes a plurality of alternative AHBAs 619. Each alternative AHBA 619 is substantially similar to exemplary AHBA 119, with the exception that each AHBA 619 is configured to operate in conjunction with a plurality of AHBAs 619. System 600 includes a plurality of components that are similar to their counterparts within system 100 as described above, however, such components are configured to facilitate operation of system 600 and plurality of AHBAs 619. Such components include, but are not limited to, an alternative second hydraulic fluid conduit 620 that is configured to channel sufficient hydraulic fluid to each AHBA 619. In this alternative embodiment, system 600 includes two AHBAs 619. Alternatively, system 600 includes any number of AHBAs 619 that facilitates operation of system 600 as described herein, including, but not being limited to, an individual AHBA 619 for each brake actuator 122. Operation of system 600 is similar to operation of system 100 (shown in FIG. 1).

Figure 7:
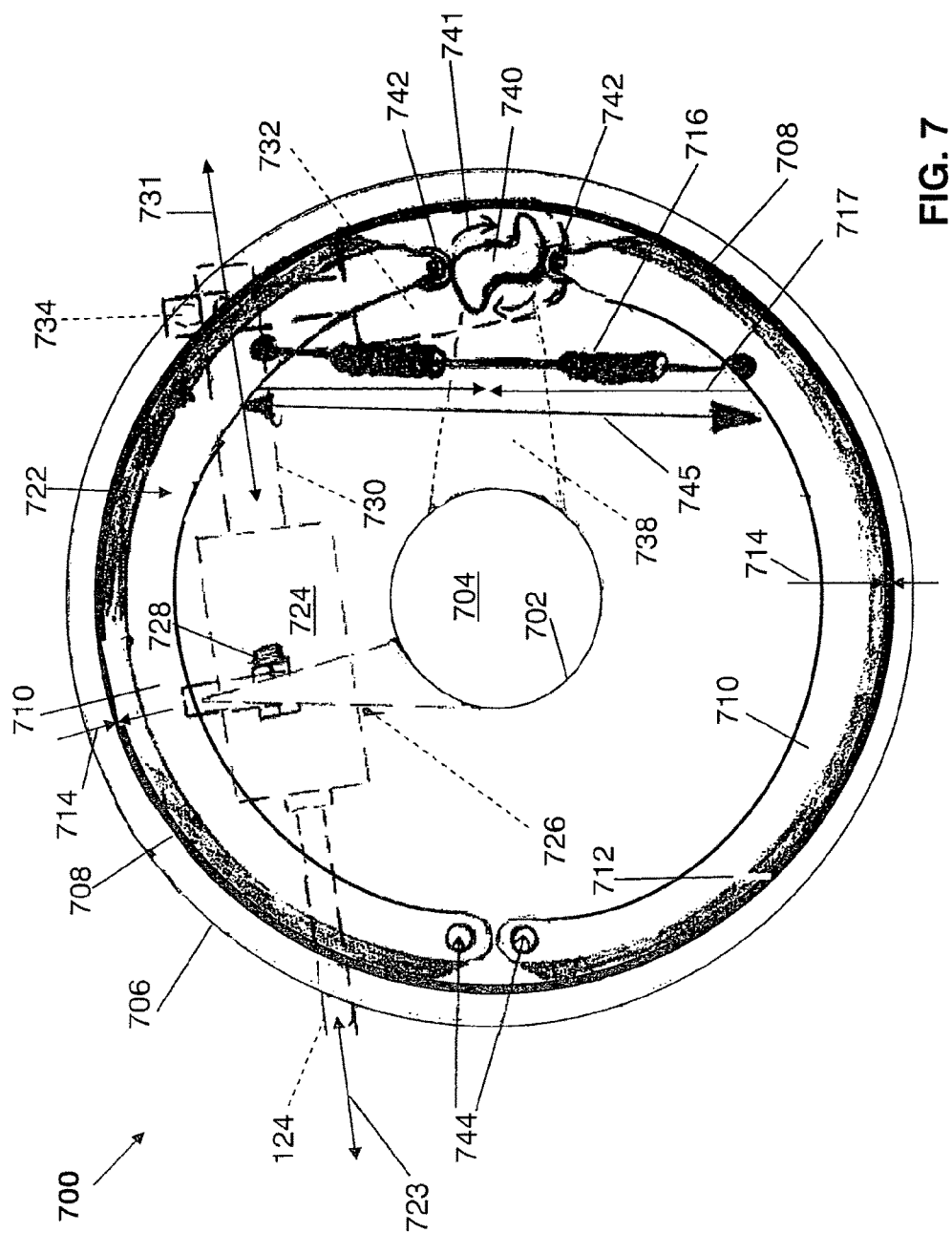
FIG. 7 is a schematic view of an alternative braking mechanism that may be used with the vehicle braking systems shown in FIGS. 1 and 6.
Figure 8:
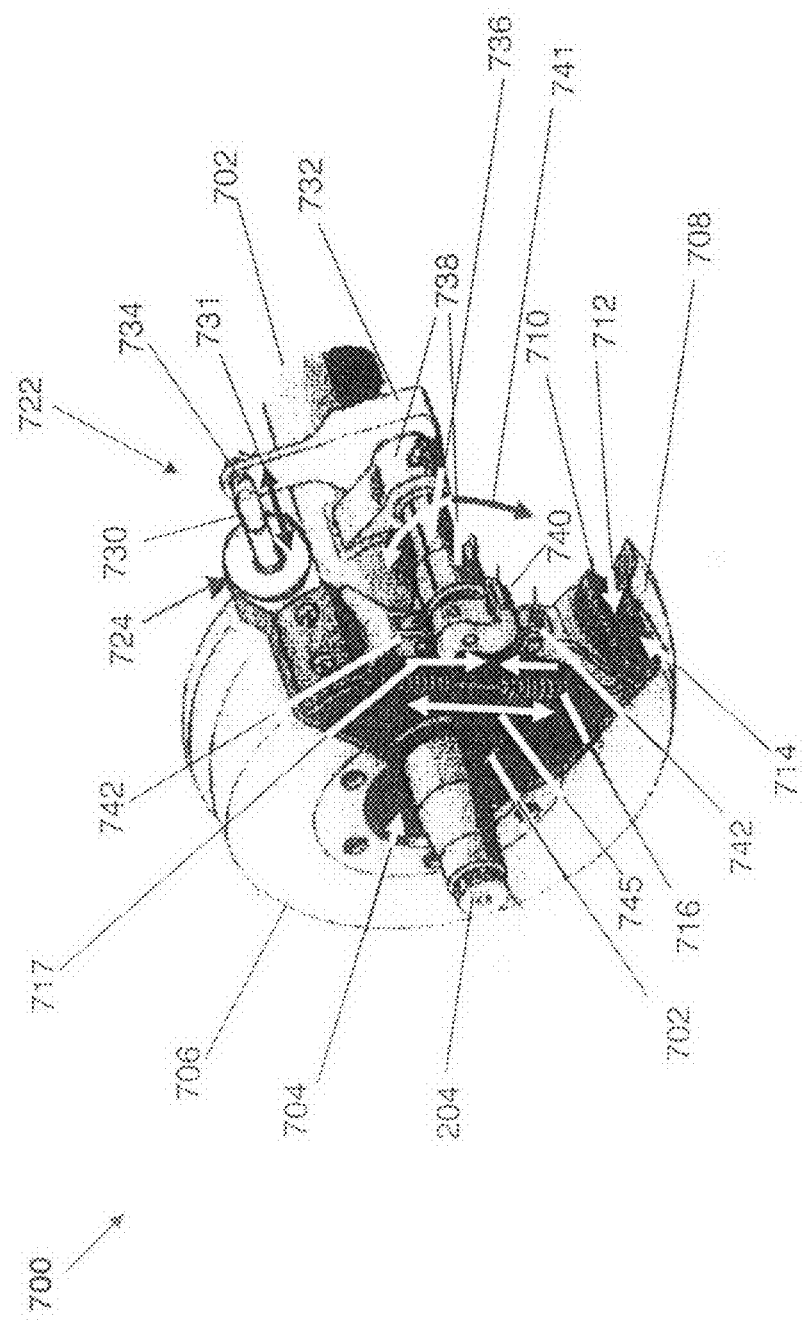
FIG. 8 is an orthographic view of the alternative braking mechanism shown in FIG. 7.

FIG. 7 is a schematic view of an alternative braking mechanism 700 that may be used with vehicle braking systems 100 and 600 (shown in FIGS. 1 and 6, respectively). FIG. 8 is an orthographic view of alternative braking mechanism 700. Mechanism 700 is similar to mechanism 500 wherein mechanism 700 includes an axle tube 702 that at least partially defines an axle cavity 704 wherein cavity 704 is sized to receive at least a portion of axle 204. Mechanism 700 also includes a brake drum 706 that is substantially arcual and includes a radially inner surface 708. Brake drum 706 is rotatably coupled to a portion of axle 204 of vehicle 200 and is configured to rotate with axle 204 and wheels and tires 202 (shown in FIG. 2).

Mechanism 700 further includes a plurality of substantially arcual brake shoes 710. Each of brake shoes 710 include a radially inner surface, or lining 712. Linings 712 and surface 708 are configured such that contact of linings 712 with surface 708 induces a stopping force on vehicle 200 (shown in FIG. 2). Typically, during periods wherein braking action is not employed, linings 712 and surface 708 are maintained at a predetermined distance 714 from each other. Specifically, in the exemplary embodiment, during such periods of operation, distance 714 is maintained within range 0.0 mm to 0.254 mm (0.000 in. to 0.010 in.). Linings 712 are configured to facilitate substantially continuous light rubbing with surface 708 within such range of distance 714 while mitigating heat generation and excessive wear. Alternatively, any range for distance 714 is used that facilitates operation of systems 100 and 600 (shown in FIGS. 1 and 6, respectively) as described herein.

Mechanism 700 differs from mechanism 500 in that mechanism 700 is an S-Cam-type braking mechanism that includes an alternative brake actuator 722 coupled to brake shoes 710 as discussed further below. In these alternative embodiments, alternative actuators can be used in place of exemplary actuators 122 (shown in FIGS. 1 and 6). Therefore, fluid conduits 124 are coupled in flow communication with each brake actuator 722 and either of AHBA 119 and 619 (shown in FIGS. 1 and 6) wherein fluid enters and leaves actuator 722 as illustrated by arrows 723.

In this alternative embodiment, each brake actuator 722 is an S-Cam-type brake actuator. As such, actuator 722 includes a hydraulic cylinder 724, wherein cylinder 724 is coupled in flow communication with conduit 124. Moreover, cylinder 724 is fixedly coupled to axle tube 702 via a cylinder mounting bracket 726 with mounting hardware 728, wherein bracket 726 is fixedly coupled to tube 702 via methods that include, but are not limited to, welding. Cylinder 724 includes a cylinder arm 730 that is configured to convert a change in pressure within conduit 124 into a change in position of arm 730 in a direction that is substantially axial to cylinder 724 as illustrated by arm position arrows 731.

Actuator 722 also includes a brake arm 732 coupled to cylinder arm 730 via retention hardware 734. Brake arm 732 is rotatably coupled to a cam shaft 736 via standard mechanical coupling methods. Cam shaft 736 is axially aligned by a plurality of cam shaft guide brackets 738, wherein each bracket 738 is fixedly coupled to tube 702. Actuator 722 further includes a brake cam 740 rotatably coupled to cam shaft 736 such that clockwise and counter-clockwise rotation of shaft 736 translates into similar rotation of cam 740 as illustrated by cam rotational arrows 741.

Actuator 722 also includes two cam rollers 742, wherein each roller 742 is coupled to each brake shoe 710. Each roller 742 facilitates contact of brake cam 740 with rollers 742 while mitigating wear of rollers 742 and cam 740 throughout periods of contact of cam 740 with rollers 742. Actuator 722 further includes a plurality of shoe pivot pins 744 that extend at least partially into brake drum 706, wherein each pin 744 facilitates lateral support for each associated brake shoe 710 and facilitates predetermined radially inward and outward movement of shoe 710 away from and toward, respectively, brake drum 706 as illustrated by shoe movement arrows 745. Actuator 722 also includes a brake spring assembly 716 wherein assembly 716 is coupled each brake shoe 710. Similar to springs 516 (shown in FIG. 5) spring assembly 716 is configured to induce the first bias within system 100. Specifically, spring assembly 716 is configured to induce a radially inward force opposite in direction to a force produced by cam 740 contacting rollers 742 and radially expanding shoes 710 outward within actuator 722. Such radially inward force is illustrated by spring bias arrows 717. Shoes 710, conduits 124, and actuator 722 are configured to remain substantially rotationally stationary within mechanism 700.

Referring to FIGS. 7 and 8, in operation, as an operator depresses brake 103 (shown in FIGS. 1 and 6) hydraulic fluid in conduits 124 flows into brake actuator 722, or, more specifically, in hydraulic cylinder 724 as shown by arrow 723, and fluid pressure within cylinder 724 increases as a function of the degree of depression of brake 103 as discussed above. Moreover, cylinder arm 730 extends outward against the first bias of mechanism 700 induced by spring assembly 716 as shown by arrow 731. The outward motion of arm 730 is transferred to cam shaft 736 via brake arm 732 and cam shaft 736 rotates in the clockwise direction as shown by arrow 741. Such clockwise rotation of cam shaft 736 rotates brake cam 740 in the clockwise direction such that cam 740 contacts rollers 742 and each of brake shoes 710 pivot about pins 744 and extend radially outward as shown by arrow 745 and distance 714 decreases to zero, if not already attained. As shoes 710 extend radially outward, spring assembly 716 is also extended such that the first bias, as indicated by arrows 717, is increased. Once distance 714 decreases to zero, rotationally stationary linings 712 contact surface 708 of rotating drum 706, and the braking action of vehicle 200 (shown in FIG. 2) is generated and a rotational speed of drum 706 decreases. The braking action is proportional to the force exerted between linings 712 and surface 708 that is proportional to an amount of depression of brake 103 and the subsequent hydraulic fluid pressure increase. Therefore, the braking action is proportional to an amount of depression of brake 103.

Similarly, as an operator relaxes depression on brake 103, fluid pressure in conduits 124 decreases, and cylinder arm 730 retracts into hydraulic cylinder 724 which facilitates counter-clockwise rotation of cam shaft 736 and brake cam 740 via brake arm 732. As cam 740 rotates against rollers 742, the first bias of mechanism 700 induced by spring assembly 716 induces a radially inward movement of shoes 710. The force exerted between linings 712 and surface 708 begins to decrease as distance 714 approaches approximately 0.0 mm to 0.254 mm (0.000 in. to 0.010 in.) and the braking action of vehicle 200 (shown in FIG. 2) is substantially removed. As discussed above, extended periods of light rubbing between linings 712 and surface 708 at a distance 714 of approximately zero are tolerable. In the event that brake shoes 710 retract radially inward such that distance 714 increases away from zero, rotationally stationary linings 712 break contact with surface 708 of rotating drum 706, and the braking action of vehicle 200 is completely removed. Moreover, hydraulic fluid is channeled through conduits 124 to converter 106 via AHBA 119 (both shown in FIGS. 1 and 6). As hydraulic fluid pressure within cavity 308 of AHBA 119 and within conduit 120 (both shown in FIGS. 1, 3 and 6) decreases and valve 310 closes off ports 306 and 304 as described above, a substantially static hydraulic fluid pressure value of approximately 276 kPa to 552 kPa (40 psi to 80 psi) is maintained within conduits 124. Such residual pressure facilitates maintaining distance 514 within the range 0.0 mm to 0.254 mm (0.000 in. to 0.010 in.).

While mechanism 700 can be factory installed on new vehicles, current vehicles may be retrofitted with mechanism 700 as well. For example, on some models of standard service brakes (not shown), an associated slack adjuster and air chamber (neither shown) are removed, actuator 722 is installed, and conduit 124 is run to hydraulic cylinder 724.

The methods and apparatus as described herein facilitate maintaining vehicle braking systems. Specifically, the method of assembling a vehicle braking system retrofit package as described above facilitates decreasing maintenance time, labor and total costs of ownership associated with frequently adjusting brake calibration. Also, the robust, self-adjusting braking systems facilitate increasing an in-service time of the associated vehicles. Such associated vehicles include any heavy vehicle that is configured with wedge or S-Cam brakes including, but not limited to, on-road trucks, off-road trucks, and construction vehicles.

Exemplary embodiments of vehicle braking systems are described above in detail. The methods, apparatus and systems are not limited to the specific embodiments described herein nor to the specific illustrated vehicle braking systems.

While the invention has been described in terms of various specific embodiments, those skilled in the art will recognize that the invention can be practiced with modification within the spirit and scope of the claims.

What is claimed is:

1. A method of assembling a vehicle braking system retrofit package comprising:
    assembling a braking mechanism;
    assembling at least one automatic hydraulic brake adjuster (AHBA) comprising:
        forming a valve body that defines a cavity therein;
        inserting a valve in the cavity; and
        coupling at least one biasing device to the valve;
    coupling the at least one AHBA in flow communication with the braking mechanism; and
    adjusting the at least one biasing device such that the valve and the at least one biasing device cooperate to:
        channel two-way fluid flow through the valve when the valve is in an open position to facilitate dynamic modulation of the braking mechanism to induce braking action therefrom; and
        facilitate maintenance of a predetermined fluid pressure downstream of the valve at least partially as a result of the two-way fluid flow when the valve is in a closed position.

2. A method in accordance with claim 1 wherein assembling the braking mechanism comprises:
    coupling at least one piston of a brake actuating device to at least one brake spring; and coupling at least one brake shoe to the at least one brake spring.

3. A method in accordance with claim 1, wherein assembling at least one AHBA further comprises:
    defining a plurality of fluid ports within said valve body;
    forming the at least one biasing device with predetermined biasing characteristics such that the at least one biasing device induces an adjustable predetermined bias value on the valve; and
    coupling the valve to the at least one biasing device within the valve body such that the valve and the at least one biasing device cooperate to modulate the two-way fluid flow through the plurality of fluid ports.

4. A method in accordance with claim 3, wherein coupling the valve and the at least one biasing device within the valve body comprises coupling at least one adjusting screw to at least one valve spring such that the at least one adjusting screw facilitates inducing the bias proximate the predetermined bias value.

5. A method in accordance with claim 1 further comprising coupling at least one fluid pressure locking device in flow communication with the at least one AHBA such that the at least one fluid pressure locking device facilitates maintaining a predetermined pressure within at least a portion of the vehicle braking system retrofit package.

6. A method in accordance with claim 1 further comprising positioning at least one pressure sensing device within the vehicle braking system retrofit package.

7. An automatic hydraulic brake adjuster (AHBA), wherein said AHBA is coupled in flow communication with a braking mechanism including at least one brake shoe and a brake drum circumferentially extending about the at least one brake shoe, said AHBA comprises:
    a valve; and
    at least one biasing device coupled to said valve, wherein said valve and said at least one biasing device cooperate to:
        channel two-way fluid flow through said valve when said valve is in an open position to facilitate dynamic modulation of the braking mechanism and braking action therefrom; and
        facilitate maintenance of a predetermined fluid pressure downstream of said valve at least partially as a result of the two-way fluid flow when said valve is in a closed position.

8. An AHBA in accordance with claim 7, wherein said valve comprises a valve seat comprising a seating surface that is at least partially beveled and has a predetermined surface area that facilitates opening of said valve.

9. An AHBA in accordance with claim 7, wherein said at least one biasing device comprises at least one adjusting screw that facilitates inducing a bias to a said valve.

10. An AHBA in accordance with claim 9, wherein said at least one biasing device further comprises at least one valve spring, wherein said at least one adjusting screw is configured to adjust the bias via one of compression and relaxation of said at least one valve spring.

11. An AHBA in accordance with claim 8 further comprising a valve body configured to at least partially define a plurality of fluid ports, wherein said valve seat is configured to cooperate with said plurality of fluid ports to modulate a fluid pressure downstream of at least one of said plurality of fluid ports.

12. A vehicle braking system comprising:
    at least one brake shoe comprising a radially outer surface;
    a brake drum comprising a radially inner surface circumferentially extending about at least a portion of said at least one brake shoe radially outer surface;

at least one brake actuating device coupled to said at least one brake shoe; and at least one automatic hydraulic brake adjuster (AHBA), wherein said AHBA is coupled in flow communication with said at least one brake actuating device, said at least one AHBA comprising:

a valve; and at least one biasing device coupled to said valve, wherein said valve and said at least one biasing device cooperate to:

channel two-way fluid flow through said valve when said valve is in an open position to facilitate dynamic modulation of a radial position of said at least one brake shoe radially outer surface with respect to said at least one brake drum radially inner surface and braking action therefrom; and facilitate maintenance of a predetermined fluid pressure downstream of said valve at least partially as a result of the two-way fluid flow when said valve is in a closed position.

13. A vehicle braking system in accordance with claim 12, wherein said valve comprises a valve seat comprising a seating surface that is at least partially beveled and has a predetermined surface area that facilitates opening of said valve.

14. A vehicle braking system in accordance with claim 12, wherein said at least one biasing device comprises at least one adjusting screw that facilitates inducing a bias to said valve.

15. A vehicle braking system in accordance with claim 14, wherein said at least one biasing device further comprises at least one valve spring, wherein said at least one adjusting screw is configured to adjust the bias via one of compression and relaxation of said at least one valve spring.

16. A vehicle braking system in accordance with claim 13 further comprising a valve body configured to at least partially form a plurality of fluid ports, wherein said valve seat is configured to cooperate with said plurality of fluid ports to modulate a fluid pressure downstream of at least one of said plurality of fluid ports.

17. A vehicle braking system in accordance with claim 12 wherein said at least one brake actuating device comprises a plurality of pistons, wherein each of said plurality of pistons is coupled to said at least one brake shoe, wherein said plurality of pistons is configured to modulate the radial position of said at least one brake shoe radially outer surface with respect to said at least one brake drum radially inner surface.

18. A vehicle braking system in accordance with claim 12, wherein said at least one brake actuating device comprises a cam drive mechanism, wherein said cam drive mechanism is coupled to said at least one brake shoe, wherein said cam drive mechanism is configured to modulate the radial position of said at least one brake shoe radially outer surface with respect to said at least one brake drum radially inner surface.

19. A vehicle braking system in accordance with claim 12 further comprising at least one of:

at least one hydraulic fluid pressure locking device; and at least one pressure sensing device.

20. A vehicle braking system in accordance with claim 19, wherein said at least one hydraulic fluid pressure locking device is configured to facilitate maintenance of a predetermined fluid pressure within at least a portion of said vehicle braking system.

* * * * *